(12) United States Patent
Ryu

(10) Patent No.: US 8,488,940 B2
(45) Date of Patent: Jul. 16, 2013

(54) VIDEO INFORMATION RECORDING METHOD AND VIDEO INFORMATION REPRODUCING APPARATUS

(75) Inventor: Tomoaki Ryu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 593 days.

(21) Appl. No.: 12/738,053

(22) PCT Filed: Oct. 8, 2008

(86) PCT No.: PCT/JP2008/068272
§ 371 (c)(1),
(2), (4) Date: Apr. 14, 2010

(87) PCT Pub. No.: WO2009/060682
PCT Pub. Date: May 14, 2009

(65) Prior Publication Data
US 2010/0220979 A1 Sep. 2, 2010

(30) Foreign Application Priority Data
Nov. 9, 2007 (JP) ................................. 2007-291760

(51) Int. Cl.
*H04N 9/80* (2006.01)
(52) U.S. Cl.
USPC ..................... 386/239; 386/E5.064; 369/47.2
(58) Field of Classification Search
USPC ............................ 386/E5.064, 239; 369/47.2
See application file for complete search history.

(56) References Cited

U.S. PATENT DOCUMENTS

| 5,991,502 A | 11/1999 | Kawakami et al. |
| 6,829,204 B2* | 12/2004 | Yoshida ...................... 369/47.47 |
| 7,889,608 B2* | 2/2011 | Ueki .......................... 369/47.33 |
| 2002/0044757 A1 | 4/2002 | Kawamura et al. |
| 2003/0190153 A1 | 10/2003 | Itoh et al. |
| 2005/0238323 A1 | 10/2005 | Takashima et al. |
| 2006/0215986 A1 | 9/2006 | Moon et al. |
| 2007/0136522 A1 | 6/2007 | Umemura et al. |

FOREIGN PATENT DOCUMENTS

| JP | 7-193785 A | 7/1995 |
| JP | 9-106631 A | 4/1997 |
| JP | 2000-50210 A | 2/2000 |
| JP | 2005-44506 A | 2/2005 |
| JP | 2005-317172 A | 11/2005 |
| JP | 2007-157011 A | 6/2007 |
| JP | 2007-528568 A | 10/2007 |
| JP | 2008-159233 A | 7/2008 |
| WO | WO 02/23896 A1 | 3/2002 |
| WO | WO 2005/004147 A1 | 1/2005 |

* cited by examiner

*Primary Examiner* — Thai Tran
*Assistant Examiner* — Girumsew Wendmagegn
(74) *Attorney, Agent, or Firm* — Birch, Stewart, Kolasch & Birch, LLP.

(57) ABSTRACT

The amount of data stored in a video buffer (3) that temporarily stores multi-angle streams (A, B) is controlled from information giving the distance between the angle blocks (A_1, B_1, A_2, B_2, . . . ) of the multi-angle streams and an audio stream (C) on a recording medium (10). In multi-angle playback, in which multiple files are read simultaneously, this can shorten the time from when the user switches the angle until the image reproduced by a video display apparatus changes to the intended angle.

10 Claims, 9 Drawing Sheets

```
Index_info{
    number_of_GOP;
    for(k=0;k<number_of_GOP;k++){
        GOP_id;
        file_distance;
        I_PTS(k);
        I_SCN(k);
        Angle_flag;
    }
}
```

Index_info{
  number_of_GOP;
  for(k=0;k<number_of_GOP;k++){
    GOP_id;
    I_PTS(k);
    I_SCN(k):
    Angle_flag;
  }
}

```
Index_info{
    number_of_GOP;
    file_distance;
    for(k=0;k<number_of_GOP;k++){
        GOP_id;
        I_PTS(k);
        I_SCN(k);
        Angle_flag;
    }
}
```

FIG.6(a) AMOUNT OF DATA IN VIDEO BUFFER

FIG.6(b) AMOUNT OF DATA IN AUDIO BUFFER

```
Index_info{
    number_of_GOP;
        for(k=0;k<number_of_GOP;k++){
        GOP_id;
        file_distance;
        I_PTS(k);
        I_SCN(k);
        Angle_flag;
        }
}
```

```
Index_info{
    number_of_GOP;
    file_distance;
    file_distance_3D;
    for(k=0; k < number_of_GOP;k++){
        GOP_id;
        I_PTS(k);
        I_position(k);
        Angle_flag;
    }
```

FIG.14

```
Index_info{
    number_of_GOP;
    for(k=0;k<number_of_GOP;k++){
        GOP_id;
        file_distance;
        file_distance_3D;
        I_PTS(k);
        I_position(k);
        Angle_flag;
    }
}
```

VIDEO INFORMATION RECORDING METHOD AND VIDEO INFORMATION REPRODUCING APPARATUS

FIELD OF THE INVENTION

The present invention relates to a method of recording video information on optical discs and other disc-shaped recording media and a video reproducing apparatus for reproducing video information from the recording media.

BACKGROUND ART

As a method of reproducing two or more files that have been recorded on an optical disc while reading them in turn, a system that reads two files alternately and reproduces them by preparing a comparatively large buffer memory, reading a sufficient part of one file into the buffer memory, then reading the other file, and repeating these operations alternately has been proposed (in Patent Document 1, for example).
Patent Document 1: International Publication WO/2002/023896

DISCLOSURE OF THE INVENTION

Problems to be Solved by the Invention

A general method of simultaneously reproducing a video data file recorded on a disc and a data file, for example, an audio data file, placed in a position physically separate from the video data file on the disc will now be described.

When two files are reproduced simultaneously, a general method is to prepare a sufficiently large buffer for each file, read a sufficient quantity of data into the buffer, and then resume reading the other file before the other file's buffer becomes empty. In order to enable all reproducing apparatus to reproduce without interruption, that is, to increase compatibility between reproducing apparatuses, there are specified standards for the physical positions of the two files, the file reading rate (speed), the size of the buffer memory that temporarily stores a file that has been read, etc. It will be assumed here that the encoding rate of the video file is specified at 5 Mbps and the maximum difference between the physical positions of the two files is specified as one-half stroke or less. One-half stroke means one half of the distance between the innermost track and the outermost track of the recording area on the disc. It is also assumed that the time required for the drive that reproduces the disc to seek one-half stroke is 1 sec.

A reproducing method that does not interrupt the decoding of video data and audio data will now be described on the conditions given above. During the reading of the video data, when an excursion is made to read the audio data, while seeking to the position of the audio data, reading the audio data, and then returning to read the video data again, reproduction must be carried out by using the video data stored in the buffer. If it takes 1 sec to read the audio data, then for a total of 3 sec, the video data cannot be read and reproduction must proceed by using the video data stored in the buffer. Therefore, before departing to read the audio data, it is necessary to have a minimum of 15 Mbits of video data stored in the video buffer.

Since several seconds of video data are read into and held in the buffer as described above, a disadvantage arises when, for example, multi-angle content is reproduced. The multi-angle function generally used in DVDs etc. enables the user to choose arbitrarily from among images that were recorded simultaneously from a plurality of camera angles. Multi-angle content is reproduced by selectively reading only the video data for a specified angle, and when the user performs a switching operation, reading the video data for a different angle. Therefore, if 15 Mbits of data are stored in the buffer, when the data stream to be read is switched, the data for the angle before the switchover continue to be decoded and displayed until the data stored in the buffer have been consumed. More specifically, after the user gives an instruction to switch angles, it may take 3 seconds or more until the angle is actually switched, significantly impairing ease of operation. A method of avoiding this problem is to read the data for all angles, but because this method requires a drive with a high-speed reading capability and a large-capacity buffer memory, it is costly and unrealistic.

An object of the present invention, in order to solve the problem described above, is to provide a disc recording method and a video information reproducing apparatus that can switch the image angle displayed by a video display apparatus in a short time after the user has performed an angle switching operation, even when two or more files are reproduced simultaneously.

Means of Solution of the Problems

In a method of recording on a disc-shaped recording medium permitting multi-angle playback, the video information recording method of the present invention is a video information recording method that:
successively records angle blocks, each including one or two or more GOPs of a video data stream for one angle, in a first recording area on the recording medium; and
records a related stream, to be reproduced simultaneously with the multi-angle video data streams, in a second recording area on the recording medium;
and is characterized by
recording distance information indicating a distance on the recording medium between the part of the first recording area in which each angle block is recorded and the corresponding part of the related stream in the second recording area, to be reproduced simultaneously with the angle block.

Effect of the Invention

According to the present invention, when multi-angle content is reproduced, even if a plurality of files are read simultaneously and reproduced simultaneously, after the user has performed an angle switching operation, the newly selected video data can be displayed promptly.

BRIEF DESCRIPTION OF THE DRAWINGS

FIG. 14 is a diagram showing the syntax of an index information file in the third embodiment.

Figures 1, 2:
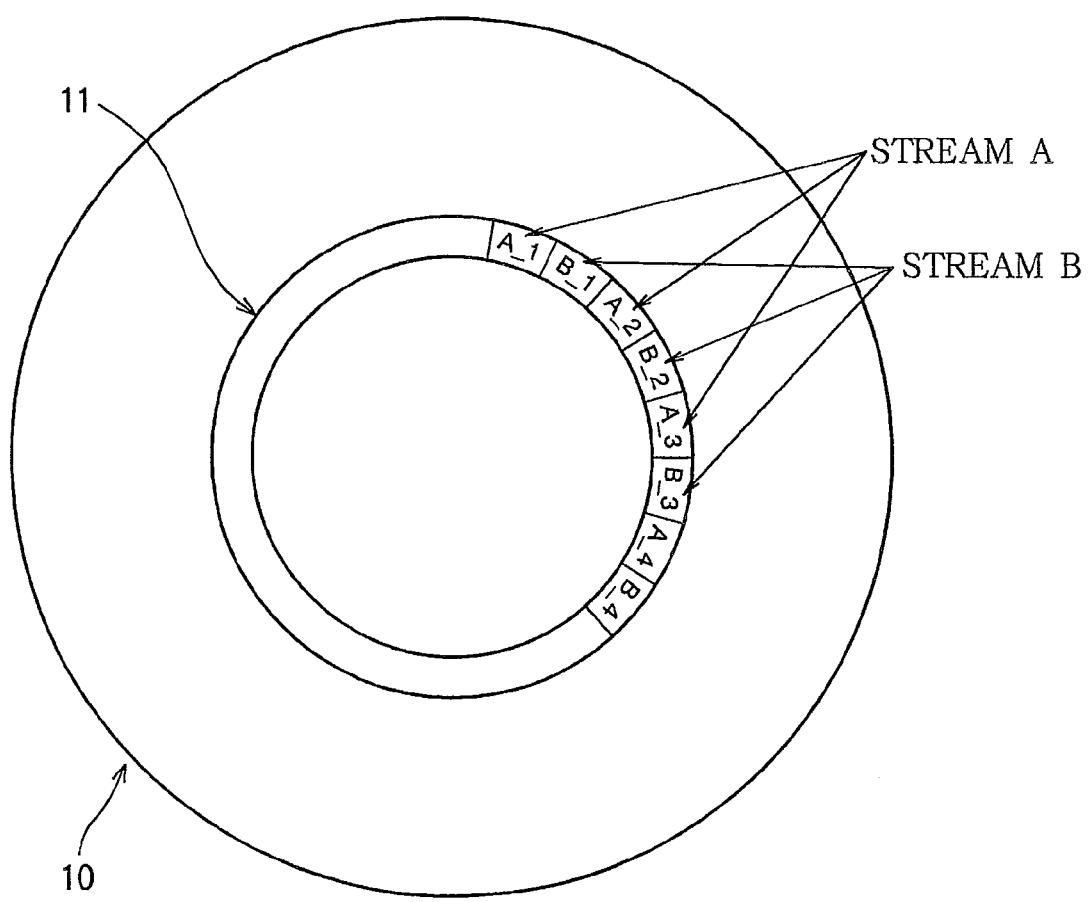
FIG. 1 is a diagram showing the syntax of an index information file in general multi-angle playback.
FIG. 2 is a diagram illustrating the physical arrangement of streams for use in multi-angle playback in general multi-angle content on a disc.

EXPLANATION OF REFERENCE CHARACTERS 1 drive, 2 multiplexer, 3 video buffer, 4 audio buffer, 5 video decoder, 6 audio decoder, 7 video display apparatus, 8 control unit, 13 video buffer, 14 video decoder

BEST MODE FOR CARRYING OUT THE INVENTION

Embodiments of the invention will now be described with reference to the attached drawings.

The video information recording method and the video information reproducing apparatus in the embodiments of the present invention carry out recording and reproducing operations on disc-shaped recording media: for example, general optical disc recording media such as DVD, CD, Blu-ray, HD-DVD, and other such recording media.

First Embodiment

First, the features of multi-angle data will be described. In the first embodiment, for simplicity of description, an exemplary case with two angles will be described. In order to facilitate angle switching, the seek time resulting from angle switching must be shortened. Accordingly, the two data are placed in physically close proximity and are respectively divided into angle blocks, and the angle blocks in the two streams are placed alternately to shorten the seek time.

An angle block is a minimum unit of data that are reproduced continuously; angle switching is performed at the head of an angle block, not at a point partway through an angle block. Because video data are generally encoded by use of MPEG-2 etc., video data can be decoded only from an I-picture at the start of a GOP (Group of Pictures). Accordingly, in order to switch angles without interruption, angle switching must be performed at the first picture of a GOP, and the GOP must be a closed GOP. More specifically, the first data of an angle block are the first picture of a GOP, and each angle block includes at least one GOP. The Presentation Time Stamp (PTS) of the first video data of the n-th angle block in each of a plurality of streams (for example, angle block An of stream A) and the PTS of the first video data of the n-th angle block of each other stream (for example, angle block Bn of stream B) indicate the same time. Because the audio data do not change when angles are switched, the n-th angle block of each stream includes the same audio data. The streams that are used in angle switching have the same number of angle blocks.

FIG. 1 gives the syntax of an index information file indicating the relationship between the time information of the first I-picture of a GOP in a stream and the physical position of the I-picture; there is one such file per stream file.

The index information file is stored as a separate file from the stream files including streams A and B on the disc. The video information reproducing apparatus reads the index information files first and then reads the stream files including streams A and B.

In the index information file, "Number_of_GOP" indicates the total number of GOPs included in the stream file to be reproduced, and the following "For" loop is repeated that number of times. The information in the file is required for random access, I-picture search, and angle switching. "GOP_id" indicates the ID number of a GOP in the stream, and is incremented from 0. "I_PTS" indicates the PTS time of the I-picture. "I_SCN" indicates the relative number of bytes from the first byte of the stream to the first byte of the first picture of the GOP. The reproducing apparatus can learn the relationship between the reproducing time of the first picture of the GOP and the position on the disc from the "I_PTS" and "I_SCN" information. "Angle_flag" indicates whether the GOP is at a point at which angles can be switched; a value of "1" signifies an angle switching point. The "Angle_flag" of the index information indicating the head of an angle block is always "1".

FIG. 2 is a diagram illustrating the arrangement in which the above angle blocks are stored on a recording medium 10. Stream A (the first stream), which is the stream for the first angle, and stream B (the second stream), which is the stream for the second angle, are stored in a first recording area 11. Video data and audio data are multiplexed in each stream. The angle blocks $A_1$, $A\_2$, $A\_3$ ... and $B\_1$, $B\_2$, $B\_3$ ... in streams A and B are placed alternately.

Figure 3:
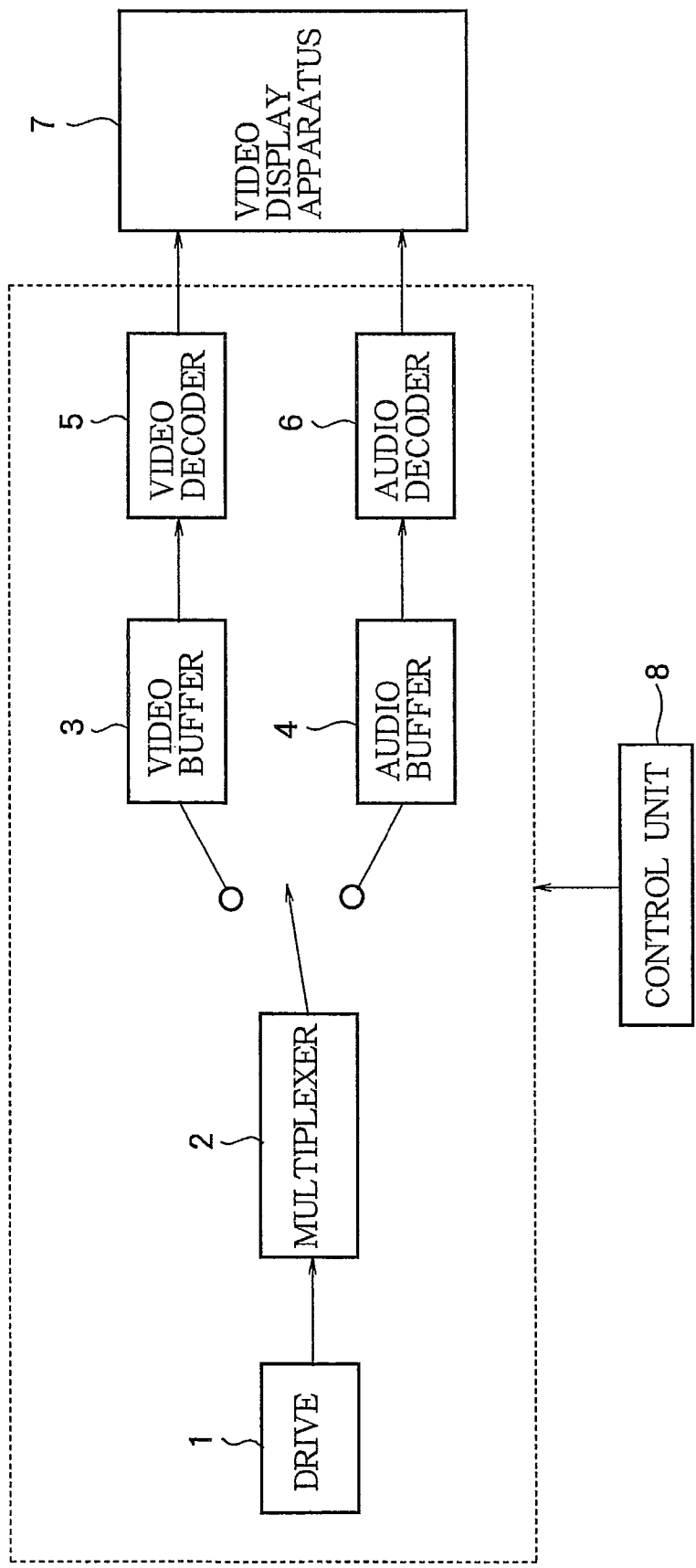
FIG. 3 is a diagram illustrating the structure of a video information reproducing apparatus in an embodiment of the invention.

FIG. 3 is a diagram illustrating an entire video information reproducing apparatus according to the invention.

The video information reproducing apparatus shown in FIG. 3 has a drive 1, a demultiplexer 2, a video buffer 3, an audio buffer 4, a video decoder 5, an audio decoder 6, a video display apparatus 7, and a control unit 8.

The drive 1 reads video data and audio data from a recording medium 10. The demultiplexer 2 demultiplexes the video data and audio data that have been read by the drive 1. The video buffer 3 temporarily stores the video data that have been read from the recording medium 10. The audio buffer 4 temporarily stores the audio data that have been read from the recording medium 10.

The video decoder 5 reads the video data stored in the video buffer 3, decodes the video data, and supplies the decoded video data to the video display apparatus 7. The audio decoder 6 reads the audio data stored in the audio buffer 4, decodes the audio data, and supplies the decoded audio data to the video display apparatus 7. The video display apparatus 7 displays video data according to the decoded video data received from the video decoder 5, and outputs sound according to the decoded audio data received from the audio decoder 6.

The control unit 8 controls the operations of the elements from the drive 1 to the video display apparatus 7 described above and includes, for example, at least one CPU and a program memory, so that part or all of the control unit 8 is implemented by software, that is, by the operation of the CPU according to the program stored in the program memory.

Stream A recorded on the recording medium 10 is read by the drive 1, and demultiplexed into video data and audio data by the demultiplexer 2. The demultiplexed video data are temporarily stored in the video buffer 3.

The video data of each angle block of stream A are stored successively in the video buffer 3. The video data are transferred from the video buffer 3 to the video decoder 5 and decoded in the video decoder 5 into a video signal that is output to the video display apparatus 7, which is a TV or the like. The demultiplexed audio data are temporarily stored in the audio buffer 4 and decoded in the audio decoder 6 into a sound signal that is output to the video display apparatus 7 (e.g., the TV).

When stream A is reproduced continuously, the angle blocks of stream B are skipped and the angle blocks of stream A are read and sent to the demultiplexer 2.

If the user performs an angle switching operation during the reproducing of stream A, the control unit 8 issues a command to the drive 1 to read stream B. If the angle block of stream A that is currently being read is angle block A_n, the switchover to stream B starts at angle block B_(n+1).

The control unit 8 identifies the starting position of angle block B_(n+1) in stream B from the index information file stored in the control unit 8, which has been read in advance of the reading of streams A and B, and directs the drive 1 to start reading from angle block B_(n+1). Accordingly, the data of angle block B_(n+1) are stored following the data of angle block A_n in the video buffer 3 and the audio buffer 4, and when the video data of angle block B_(n+1) are decoded in the video decoder 5 and output as the video signal, the user can see that the angle has been switched.

The angle switching operation described above involves only the streams (here, streams A and B) necessary for multi-angle playback. However, depending on the content that is being reproduced, reproduction may have to be simultaneous with the reproduction of a file other than the files necessary for multi-angle playback. For example, for some content the audio data and video data are reproduced asynchronously. In a slide show display with music played in the background, for example, although the video is switched to the next slide by the user, sound reproduction continues independently of the switching of the video. In situations like this, pictures and sound are reproduced asynchronously. Because video and audio cannot be reproduced from one multiplexed stream in such situations, a different stream must be provided for the audio. In situations like this, reproduction must be performed while alternately reading the multi-angle video stream and the stream used for audio reproduction.

Next, the multi-angle playback operation will be described in a context in which reproduction is performed while alternately reading a multi-angle video stream and an asynchronously reproduced audio stream.

Figures 4, 5:
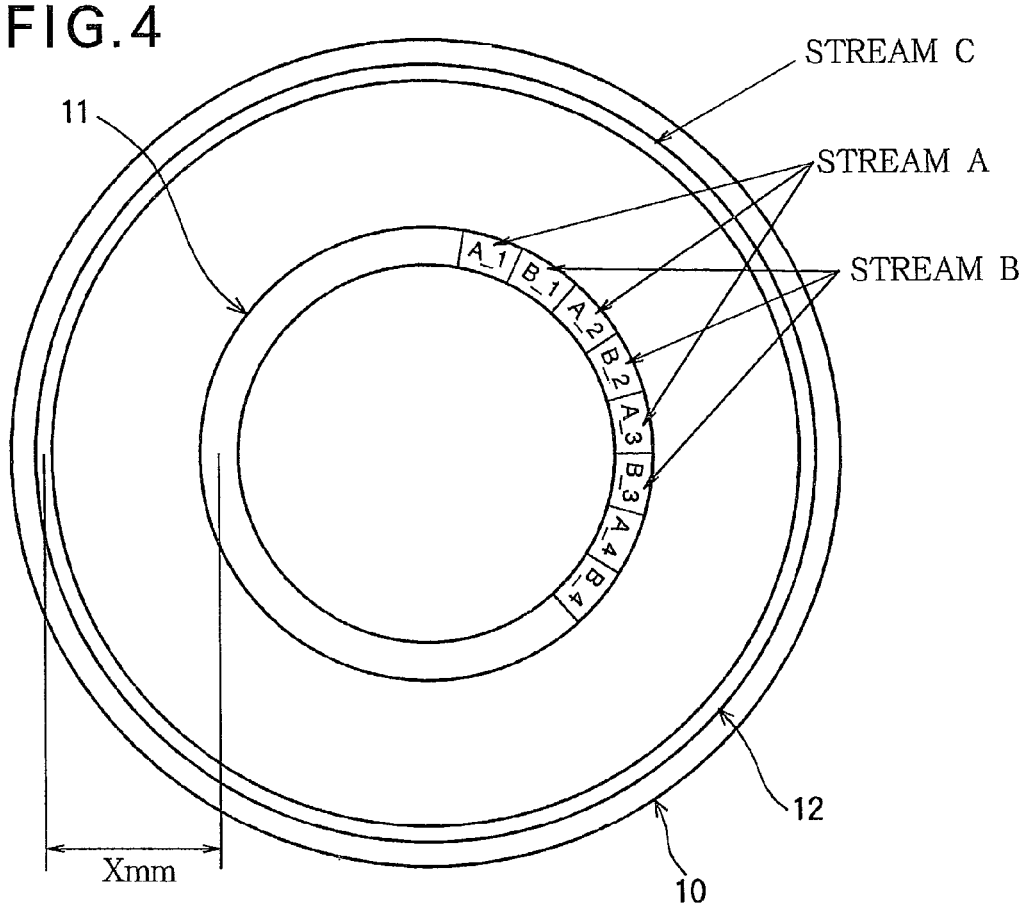
FIG. 4 is a diagram illustrating the physical arrangement of streams for use in multi-angle playback and an audio stream read alternately with those streams on a disc.
FIG. 5 is a diagram showing the syntax of an index information file in a first embodiment.

FIG. 4 is a diagram illustrating the arrangement on a recording medium 10 of streams A and B, which are used for multi-angle playback, and stream C, which is read simultaneously. The arrangement of streams A and B is the same as described with reference to FIG. 2. Streams A and B may be referred to as the 'main streams' and stream C as a 'related stream'.

Streams A and B include only video data. Stream C is situated on a track a certain distance X mm from the track on which streams A and B are recorded. Stream C includes only audio data.

Thus, streams A and B are placed in the first recording area 11 on the recording medium 10, and stream C is placed in a second recording area 12 on the recording medium 10.

The video buffer 3 temporarily stores the video data (the blocks of stream A or B) that have been read from the first recording area 11, and the audio buffer 4 temporarily stores audio data (the corresponding part of stream C) that have been read from the second recording area 12 and must be reproduced simultaneously with the video data stored in the video buffer 3, or simultaneously with video data reproduced immediately before or after the video data stored in the video buffer 3. Stream C is also referred to as a related stream that must be reproduced simultaneously with streams A and B. Since writing and reading are performed alternately in the video buffer 3 and audio buffer 4, corresponding audio data are not always stored in the audio buffer 4 for all video data stored in the video buffer 3. In other words, the audio buffer 4 temporarily stores audio data (the corresponding part of stream C) that must be reproduced simultaneously not only with the video data stored in the video buffer 3 but also with video data to be reproduced immediately before or after the video data stored in the video buffer 3, and the video buffer 3 temporarily stores video data that must be reproduced simultaneously not only with the audio data stored in the audio buffer 4 but also with audio data to be reproduced immediately before or after the audio data stored in the audio buffer 4.

FIG. 5 is a diagram showing the syntax of an index information file of a video stream used for multi-angle playback. In the index information file in FIG. 5, the syntax differs from the syntax in FIG. 1 by the addition of "file_distance" information. The "file_distance" information indicates the physical distance between stream A or B and the stream C that is read simultaneously (concurrently).

This index information file is stored as a separate file from the video streams (streams A and B) and audio stream (stream C) on the disc. The video information reproducing apparatus reads the index information file first and then reads the audio and video streams, as described above.

It is assumed here that the encoding bit rate (accordingly, the reading rate from the video buffer 3) of streams A and B is 5 Mbps, the encoding bit rate (accordingly, the reading rate from the audio buffer 4) of stream C is 0.5 Mbps, the data reading rate (speed) of the drive 1 is 10 Mbps, and the physical distance between stream A or B and stream C is 10 mm. The relationship between the time required for the drive 1 to execute a seek (the seek time) and the seek distance is as shown in Table 1; the data shown in Table 1 are stored in, for example, the control unit 8. As the data shown in Table 1, specific values may be stored for a particular video information reproducing apparatus (or a video information reproducing apparatus of particular type), or values corresponding to the minimum value of a seek speed range required in a specification may be stored.

TABLE 1

| Seek distance | Seek time |
| --- | --- |
| 0-1 mm | 50 msec |
| 1-10 mm | 300 msec |
| 10-20 mm | 500 msec |
| 20-30 mm | 750 msec |
| 30-40 mm | 1000 msec |
| 40-50 mm | 1250 msec |

The "file_distance" in the index information file is now set at 10 mm. From the seek speed table (Table 1) it can be seen that when the "file_distance" is 10 mm, the required seek time is 300 msec. If it takes 400 msec to read stream C (reading time), it takes a total of 300+400+300=1000 msec from seeking to stream C until returning to read stream A again. Because the amount of data stored in the video buffer 3 that is consumed (read) during 1000 msec is 1 sec×5 Mbps=5 Mbits, before starting to seek to stream C, it is necessary to have 5 Mbits of data stored in the video buffer 3. In actual practice, a little extra margin is necessary, so 6 Mbits of data are stored, allowing about an extra 1 Mbit.

Seeking to stream C starts when the amount of data in the audio buffer 4 falls to a prescribed value. More specifically, the time at which the amount of data in the audio buffer 4 would become zero (or a quantity greater than zero by a slight margin) if reading from the audio buffer 4 continued (without writing in the audio buffer) is predicted from the amount of data in the audio buffer 4 and the encoding rate (the reading rate from the audio buffer 4), and seeking starts at a time preceding the predicted time by just the required seek time. In the first embodiment, the 'slight margin' mentioned above is 1.2 Mbits, and because the encoding rate is 0.5 Mbps and the seek time is 0.3 seconds, seeking starts when the amount of data in the audio buffer 4 becomes 1.2 Mbits+0.3×0.5=1.35 Mbits.

Figure 6:
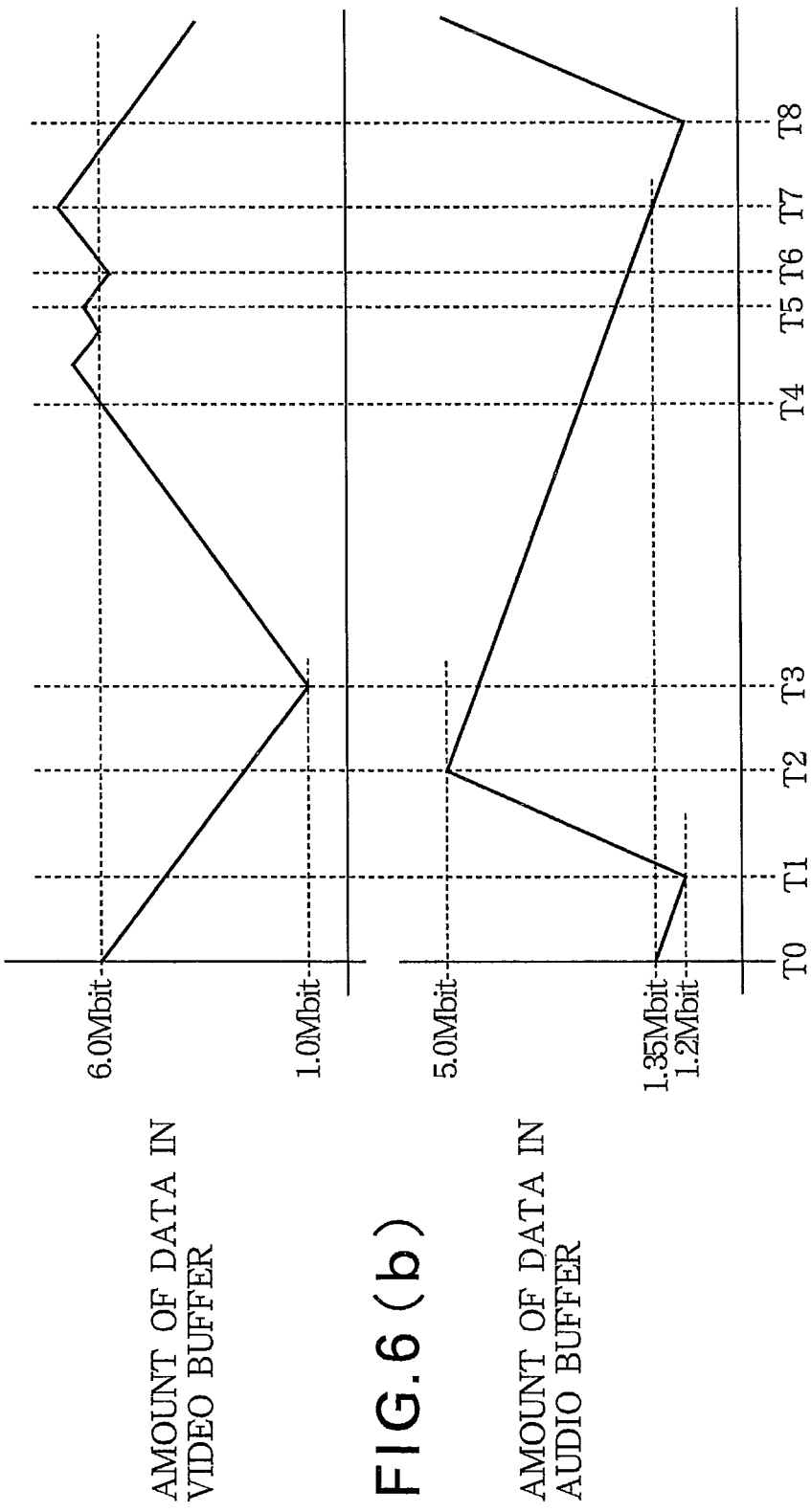
FIGS. 6(a) and 6(b) are diagrams indicating variations in the amount of data in the video buffer 3 and the audio buffer 4 over time in the operation in the first embodiment.

FIGS. 6(*a*) and 6(*b*) are diagrams indicating variations in the amount of data in the video buffer 3 and the audio buffer 4 over time.

At time T0, when it is detected that the amount of data in the audio buffer 4 has reached (fallen to) the prescribed value of 1.35 Mbits, seeking to stream C starts. The amount of data in the video buffer 3 is then 6 Mbits. Although the control unit 8 directs the drive 1 to seek to stream C at time T0 and seeking starts then, because video is reproduced during the seek, consuming the data stored in the video buffer 3, the data in the video buffer 3 continue to decrease at the encoding bit rate of 5 Mbps, and the data in the audio buffer 4 continue to decrease at the rate of 0.5 Mbps. At time T1, 300 msec later, seeking is completed, and the reading of stream C starts.

At time T1, the amount of data in the audio buffer 4 is 1.2 Mbits. If the audio encoding rate is 0.5 Mbps and the data reading rate of the drive 1 is 10 Mbps as described above, then at time T2, 400 msec after time T1, because of the 400 msec of reading, the amount of data in the audio buffer 4 is (10−0.5)Mbps*0.4 sec+1.2 Mbits=5.0 Mbits.

Because the audio encoding rate is 0.5 Mbps, if the reading of stream C can recommence within a maximum of 10 seconds from time T2, sound can be reproduced without interruption. The drive 1 starts another seek at time T2, and starts the reading of stream A at time T3, 300 msec after time T2.

Because the time from time T0 to time T3 is 1 sec, at time T3, the amount of data in the video buffer 3 is 6 Mbits−5.0 Mbps*1.0 sec=1.0 Mbit.

Next, the drive 1 reads stream A until the data stored in the video buffer 3 reaches 6 Mbits at time T4. After time T4, the control unit 8 controls the video buffer 3 by repeatedly reading and pausing so as to keep at least 6 Mbits of data in the video buffer 3. Streams A and C are read alternately and reproduced thereafter by repetitions of similar operations.

The quantity '6 Mbits' is obtained by adding a margin (1 Mbit) to the amount of data (5 Mbits) read from the video buffer 3 in the total (1 sec) of the time (0.3 sec) taken to seek from the first recording area 11 in which stream A is stored to the second recording area 12 in which stream C is stored, the time (0.4 sec) required for reading stream C in the second recording area 12 and writing into the audio buffer 4 until the amount of data in the audio buffer 14 has increased to a prescribed quantity (e.g., 5 Mbits), and the time (0.3 sec) taken to seek from the second recording area 12 to the first recording area 11, as described above; the control unit 8 estimates the required seek time with reference to Table 1, according to the information indicating the distance from the first recording area 11 to the second recording area 12.

As described above, the control unit 8 controls and varies the amount (size) of data that must be stored in the video buffer 3 according to the information indicating the distance from the first recording area 11 to the second recording area 12, the writing rate in the audio buffer 4, the reading rate from the audio buffer 4, and the amount of data (5 Mbits) that should be stored in the audio buffer 4 before seeking to the first recording area 11 from the second recording area 12 starts.

At time T5, a command to switch angles is issued by an operation by the user, and seeking to stream B starts. At time T5, the control unit 8 issues a command to seek to the head of the data in the angle block of stream B corresponding to the data of the next angle block (the angle block to be reproduced next) after the data of the newest angle block currently stored in the video buffer 3. If, for example, the n-th angle block An of stream A is being reproduced, the (n+1)-th angle block B(n+1) of stream B is the angle block to be reproduced next. Because the streams used for multi-angle playback are placed in physically highly close proximity as described above, seeking from stream A to stream B can be completed in a very short time: for example, 50 msec as shown in Table 1.

A similar short seek time is necessary when the reading of the next angle block (An+1) starts after the reading of an angle block (for example, angle block An) from the same stream (for example, stream A).

The reading of stream B starts at time T6, 50 msec after time T5. Because the amount of data of stream A remaining in the video buffer 3 is approximately 6 Mbits at the time T6 at which the reading of stream B starts, the time until the video angle that is reproduced in the video display apparatus 7 is actually switched (the time until the reproduction of stream B starts) is approximately 1.2 seconds. Streams B and C are read alternately and reproduced thereafter (this operation is exactly the same as the operation when streams A and C are read alternately and reproduced).

As described above, in the first embodiment, the 'file_distance' is used to vary the amount of data stored in the video buffer 3 according to the distance between the streams used for multi-angle playback and the related audio stream (that is, the stream that must be read alternately).

In a conventional method that does not use this information, since the reproducing apparatus cannot learn the distance between two files, the amount of data stored in the video buffer 3 must always be set on the assumption of the maximum distance between streams A and C, even if the actual distance between the two streams is short. If, for example, the specified maximum distance between two files is 40 mm, assuming that the distance has the maximum value of 40 mm regardless of the distance between the streams being actually read means that at least 2.4 seconds of data must be stored in the video buffer. Therefore, when angles are switched, a minimum of 2.4 seconds is necessary until the video angle reproduced by the video display apparatus 7 is actually switched, regardless of the distance between the two files.

When the 'file_distance' is used as in the first embodiment, the reproducing apparatus can always keep the amount of data in the video buffer at the minimum required by the distance between two files. Accordingly, a reproducing apparatus can be provided that can switch angles in a shorter time, after the user has switched the angle, than when the 'file_distance' is not used.

Second Embodiment

Figures 7, 8:
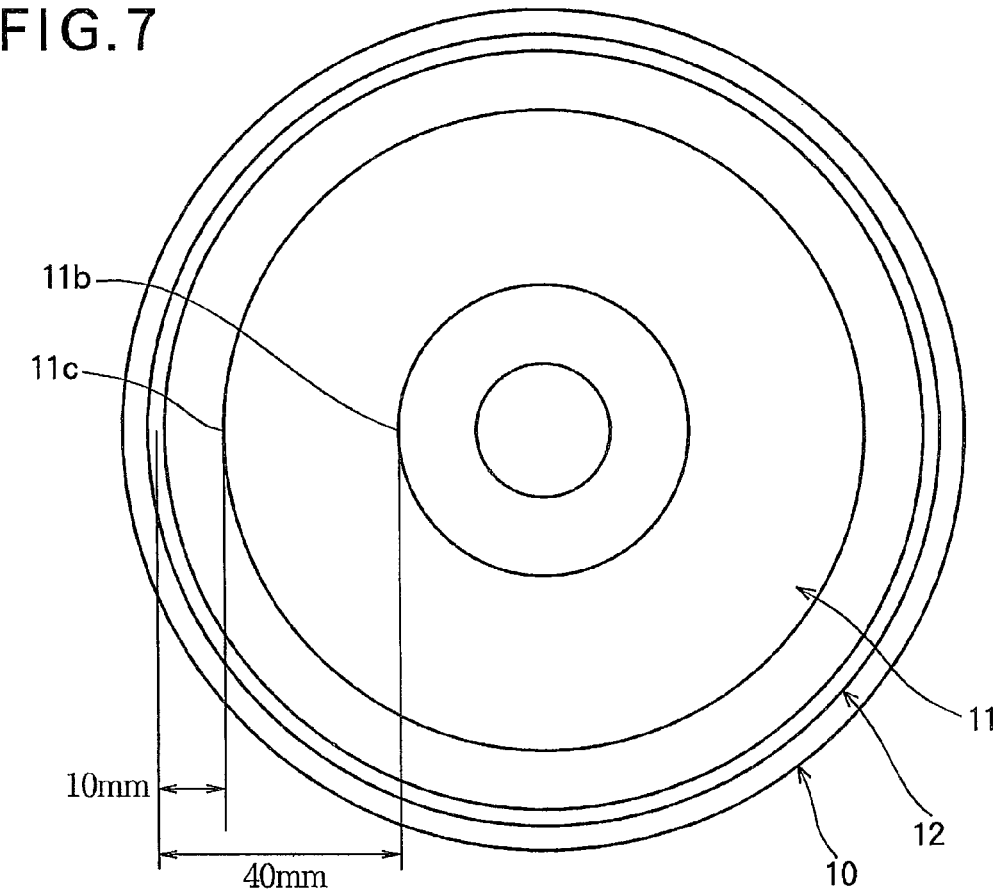
FIG. 7 is a diagram illustrating the physical arrangement of streams for use in multi-angle playback and an audio stream read alternately with those streams on a disc in a second embodiment of the invention.
FIG. 8 is a diagram showing the syntax of an index information file in the second embodiment.

Although the angle switching time can be shortened by using the 'file_distance' in the first embodiment, an insufficient shortening effect may be obtained when the streams used for multi-angle playback are very long files. FIG. 7 is a diagram illustrating a data arrangement on the recording medium 10 in which streams A and B in FIG. 4 are very long. In this situation, although the distance between the end 11e of stream A and stream C is 10 mm, the distance between the beginning 11b of stream A and stream C is 40 mm. In situations like this, because the long distance of 40 mm is set as the 'file_distance', when the part of stream A near the end 11e is reproduced, the size of the data stored in the video buffer 3 is greater than necessary. In this example, although 1.0 second of data would be satisfactory at the end 11e, 2.4 seconds of data must be stored, the same as when the beginning 11b is reproduced. Accordingly, when the angle is switched near the end, the time required until the angle is actually switched is longer than necessary.

FIG. 8 shows an index information file obtained by modifying the index information in FIG. 5 in order to solve this type of problem. The difference between the index information files in FIGS. 8 and 5 is that the "file_distance" information for each angle block is placed in the angle block: for example, in the GOP loop of the angle block (the "file_distance" of each GOP is specified in the "for" loop). The correct distance from each angle block of a stream to stream C can be learned by providing "file_distance" information for each GOP as described above. Because the "file_distance" value corresponding to an angle block near the end of the stream is 10 mm in the example described above, the data size stored in the video buffer 3 can be controlled to 1.0 second of data.

If the index information file is modified as described above, a reproducing apparatus can be provided that can always switch angles in the minimum necessary time because it can tell the shortest distance from any point on the stream being reproduced.

When not only streams A and B but also stream C is very long, information giving the distance between each part of stream A or B and the part of stream C that must be reproduced simultaneously with that part may be stored in that part of stream A or B.

The above-described distance information for each angle block may be stored in the angle block, or in a management area on the recording medium 10.

Third Embodiment

The method described in the first and second embodiments uses the "file_distance" information to reproduce a multi-angle stream and another stream simultaneously; the third embodiment will describe the application of the "file_distance" in exactly the same way when the multi-angle stream provides a three-dimensional picture.

Figure 9:
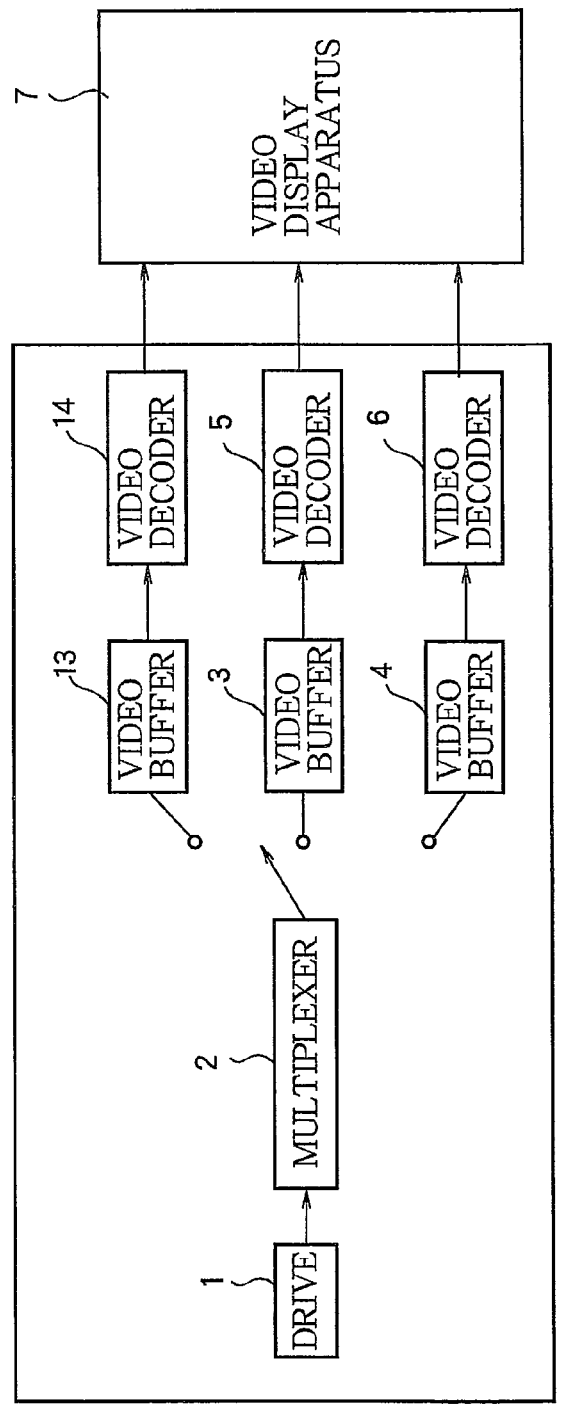
FIG. 9 is a diagram illustrating the structure of a video information reproducing apparatus in a third embodiment of the invention.

FIG. 9 is an overall depiction of a video information reproducing apparatus that displays three-dimensional streams. This video information reproducing apparatus differs from the video information reproducing apparatus in FIG. 3 by the addition of a video buffer 13 and a video decoder 14. Video buffer 13 and video decoder 14 are exactly identical to video buffer 3 and video decoder 5. The data read by the drive 1 are demultiplexed into right-eye video data, left-eye video data, and audio data by the demultiplexer 2. The right-eye video data are temporarily stored in video buffer 13 and decoded by video decoder 14 into a video signal that is output to the video display apparatus 7. The left-eye video data are temporarily stored in video buffer 3 and decoded by video decoder 5 into a video signal that is output to the video display apparatus 7.

Figure 10:
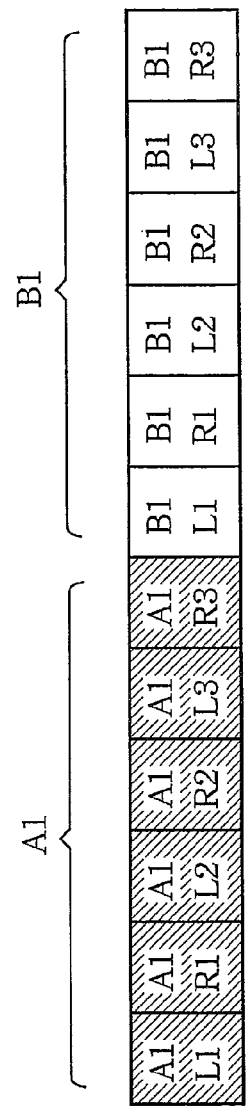
FIG. 10 is a diagram illustrating the physical arrangement of right-eye streams and left-eye streams in angle blocks on a disc in the third embodiment.

FIG. 10 is a diagram illustrating angle blocks A1 and B1 in FIG. 2 in detail. The left-eye image data L1 to L3 of angle block A1 and the right-eye image data R1 to R3 are divided into sizes such as not to underflow or overflow video buffer 3 and video buffer 13, and are placed alternately. The data are demultiplexed into left-eye image data and right-eye image data by the demultiplexer 2; the demultiplexed left-eye image data are sent to the video buffer 3; the demultiplexed right-eye image data are sent to the video buffer 13. The angle block constraints are the same as in the first embodiment; a description will be omitted.

Figures 11, 12:
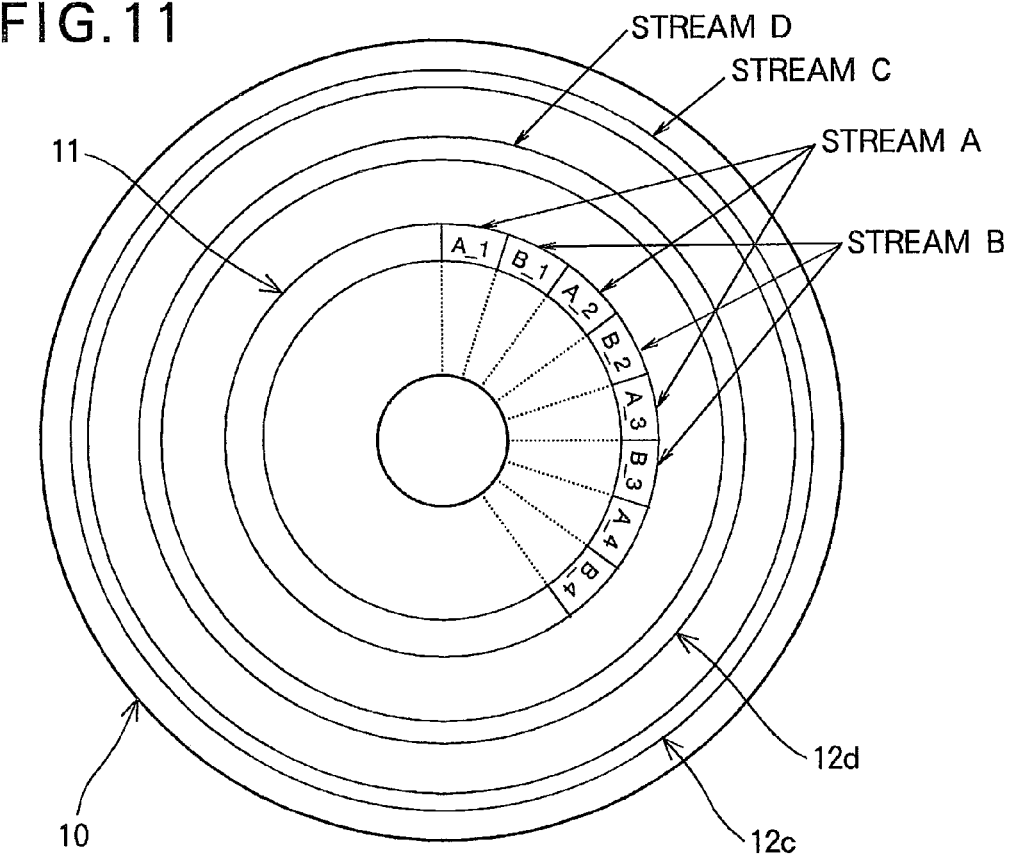
FIG. 11 is a diagram illustrating the physical arrangement of streams for use in multi-angle playback and audio streams read alternately with those streams on a disc in the third embodiment.
FIG. 12 is a diagram showing the syntax of an index information file in the third embodiment.

When a multiplexed three-dimensional stream is output to a TV or reproducing apparatus that does not support three-dimensional video, it becomes necessary to decode just one part of the video data and reproduce it as two-dimensional video. Accordingly, depending on the content, the streams read simultaneously when two-dimensional video is displayed may differ from the streams read simultaneously when three-dimensional video is displayed. The stream reproduced simultaneously, e.g., the audio data stream, may then also differ, depending on the video. Here, when either right-eye video data or left-eye video data are decoded as two-dimensional video, the stream read simultaneously will be stream C, and when the video data for both eyes are decoded, the stream read will be stream D. FIG. 11 is a diagram illustrating the physical positional relationships on the disc between the three-dimensional angle blocks, an area 12c in which stream C is placed, and an area 12d in which stream D is placed.

FIG. 12 gives the syntax of an index information file obtained by the addition of "file_distance_3D", indicating the distance to stream D, to the syntax of the index information file in FIG. 5. The distance between the angle blocks and stream C is given by "file_distance" and the distance between the angle blocks and stream D is given by "file_distance_3D". When both the right-eye and left-eye streams are decoded, the reproducing apparatus controls video buffer 3 and video buffer 13 with reference to the "file_distance_3D" value. When one of the right-eye and left-eye streams is decoded as two-dimensional video, the reproducing apparatus controls video buffer 3 and video buffer 13 with reference to the "file_distance" value.

Figure 13:
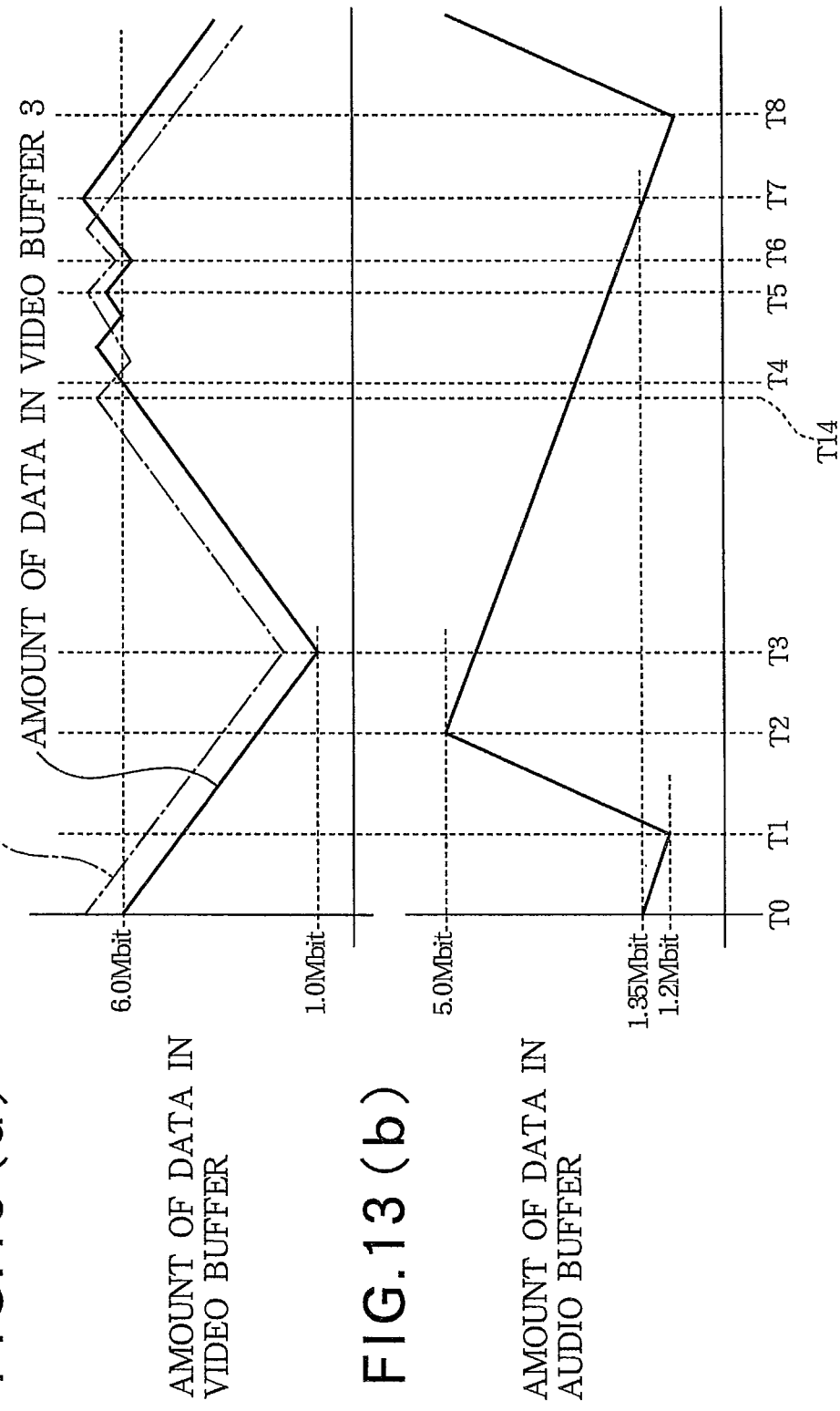
FIGS. 13(a) and 13(b) are diagrams indicating variations in the amount of data in the video buffers 3 and 13 and the audio buffer 4 over time in the operation in the third embodiment.

Exemplary variations in the amount of data in the video buffers 3 and 13 and audio buffer 4 over time when such control is performed are shown in FIGS. 13(a) and 13(b). At time T14, the data stored in the video buffer 13 have reached 6 Mbits in FIG. 13(a).

Even when the multi-angle area 11 is used for storing three-dimensional video data, one stream is read simultaneously when the data are reproduced as three-dimensional video, and another stream is read simultaneously when the data are reproduced as two-dimensional video, if the index information file is modified as described above, a reproducing apparatus can be provided that can switch angles in a short time.

If "file_distance_3D" is placed in the "for" loop as shown in FIG. 14, as in the second embodiment, even when a three-dimensional stream that is used for multi-angle playback is a very long file, a reproducing apparatus can be provided that can always switch angles in the minimum necessary time.

When not only streams A and B but also streams C and D are very long, information giving the distance between each part of stream A or B and the part of stream C or D that must be reproduced simultaneously with that part may be stored in that part of stream A or B.

The above-described distance information for each angle block may be stored in the angle block, or in a management area on the recording medium 10.

Although a multi-angle area is reproduced in the first, second, and third embodiments described above, when one video is multiplexed with plural audio in one stream (the main stream) and the audio multiplexed in the main stream is switched while simultaneously reading a stream recorded in another area, the audio can be switched quickly if the "file_distance" information is used. The "file_distance" information is also applicable not only to the switching of audio in the main stream but also to, for example, the switching of graphics for displaying subtitles or, for example, the switching of optional video for performing a picture-in-picture display, or whenever there are a plurality of switchable streams multiplexed in one area.

What is claimed is:

1. In a method of recording on a disc-shaped recording medium permitting stream switching such as multi-angle playback, audio switching, and subtitle switching, a video information recording method comprising:
  recording a stream, in which a video stream, an audio stream, and a subtitle stream are multiplexed, in a first recording area on the recording medium; and
  recording a related stream, to be reproduced simultaneously with the stream recorded in the first recording area, in a second recording area on the recording medium; and
  recording distance information indicating a distance in the radial direction on the recording medium between the stream recorded in the first recording area and the corresponding part of the related stream, recorded in the second recording area, to be reproduced simultaneously with the stream recorded in the first recording area.

2. The video recording method of claim 1, wherein the distance information is recorded in a management area on the recording medium.

3. The video recording method of claim 1, wherein the distance information indicating the distance between the stream recorded in the first recording area and the corresponding part of the related stream, to be reproduced simultaneously with said stream, is recorded in an index information file giving GOP starting position information.

4. The video recording method of claim 1, wherein the distance information indicating the distance between the stream recorded in the first recording area and the corresponding part of the related stream, to be reproduced simultaneously with said stream, is recorded in the stream recorded in the first recording area.

5. A video information reproducing apparatus for reproducing a recording medium recorded by the method of claim 1, comprising:
  a first buffer memory for temporarily storing the stream read from the first area;
  a second buffer memory for temporarily storing data of the corresponding part of the related stream read from the second area, to be reproduced simultaneously with the stream stored in the first buffer memory; and
  a control unit for varying a size of data to be stored in the first buffer memory according to the distance information indicating the distance between the part of the first recording area in which the stream being reproduced is recorded and the part of the second recording area in which the corresponding part of the related stream, to be reproduced simultaneously with said stream, is recorded, when the first recording area and the second recording area are read alternately, stored in the first and second buffer memories, read from the first and second buffer memories and reproduced.

6. In a method of recording on a disc-shaped recording medium permitting stream switching such as multi-angle playback, audio switching, and subtitle switching, a video information recording method comprising:
  recording a stream in which a video stream, an audio stream, and a subtitle stream are multiplexed in a first recording area on the recording medium; and
  recording related streams, to be reproduced simultaneously with the stream recorded in the first recording area, in a second recording area and a third recording area on the recording medium;
  recording distance information indicating a distance in the radial direction on the recording medium between the stream recorded in the first recording area and the corresponding part of the related stream, recorded in the second recording area, to be reproduced simultaneously with the stream recorded in the first recording area; and
  recording distance information indicating a distance on the recording medium between the stream recorded in the first recording area and the corresponding part of the related stream, recorded in the third recording area, to be reproduced simultaneously with the stream recorded in the first recording area.

7. The video recording method of claim 6, wherein the distance information is recorded in a management area on the recording medium.

8. The video recording method of claim 6, wherein the distance information indicating the distance between the stream recorded in the first recording area and the corresponding part of the related stream to be reproduced simultaneously with said stream is recorded in an index information file giving GOP starting position information.

9. The video recording method of claim 6, wherein the distance information indicating the distance between the stream recorded in the first recording area and the corresponding part of the related stream to be reproduced simultaneously with said stream is recorded in the stream recorded in the first recording area.

10. A video information reproducing apparatus that reproduces a recording medium recorded by the method of claim 6, comprising:
  a first buffer memory for temporarily storing a right-eye stream read from the first area and a second buffer memory for temporarily storing a left-eye stream;
  a third buffer memory for temporarily storing data of the corresponding part of the related stream read from the second area or the third area, to be reproduced simultaneously with the streams stored in the first and second buffer memories; and
  a control unit for varying a size of data to be stored in the first and second buffer memories according to the distance information indicating the distance between the stream recorded in the first recording area and the corresponding part of the related stream recorded in the second recording area or the third recording area, to be reproduced simultaneously with said stream, when the first recording area and the second recording area or the third recording area are read alternately, stored in the first, second, and third buffer memories, read from the first, second, and third buffer memories, and reproduced.

* * * * *